United States Patent [19]

Burns

[11] 4,141,870
[45] Feb. 27, 1979

[54] STABLE, WATER-BORNE VINYL CHLORIDE RESIN EMULSION COMPOSITIONS

[75] Inventor: Richard J. Burns, Piscataway, N.J.

[73] Assignee: Union Carbide Corporation, New York, N.Y.

[21] Appl. No.: 830,869

[22] Filed: Sep. 6, 1977

[51] Int. Cl.² ............................................. C08L 61/24
[52] U.S. Cl. ............................ 260/29.4 UA; 428/460; 428/463
[58] Field of Search ............ 260/29.41 UA, 29.6 PM, 260/29.6 WQ, 853; 427/388; 526/17

[56] References Cited

U.S. PATENT DOCUMENTS

| | | |
|---|---|---|
| 2,364,172 | 12/1944 | Stauffer ................................ 260/853 |
| 2,987,421 | 6/1961 | Sherwood .................... 260/29.4 UA |
| 3,361,696 | 1/1968 | Bolgiano et al. ............ 260/29.4 UA |
| 3,642,676 | 2/1972 | Saunders ........................ 260/23 EM |
| 3,957,708 | 5/1976 | Gor .............................. 260/29.4 UA |
| 4,007,147 | 2/1977 | Leeson et al. ............... 260/29.4 UA |

Primary Examiner—Theodore E. Pertilla
Attorney, Agent, or Firm—Bernard Francis Crowe

[57] ABSTRACT

Stable, water-borne emulsion compositions particularly suitable for coating metallic substrates have been prepared from solid vinyl chloride resins containing a limited amount of an oxygenated hydrocarbon solvent, non-ionic surfactant and a normally liquid urea-formaldehyde resin all emulsified to afford an internal solids content of up to about 50 weight percent.

7 Claims, 1 Drawing Figure

| COMPONENT | PARTS BY WEIGHT |
|---|---|
| VINYL RESIN | 55—67 |
| UREA-FORMALDEHYDE RESIN | 24—33 |
| SURFACTANT | 6—17 |

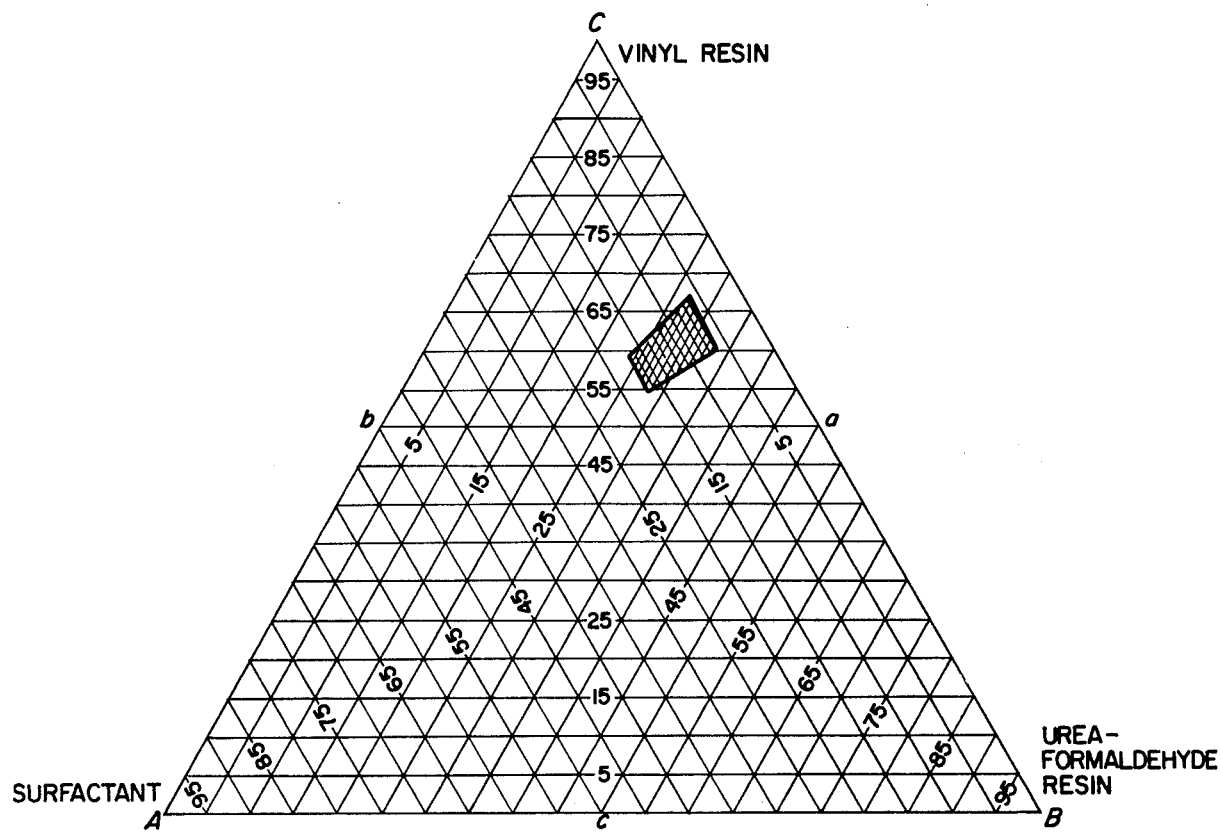
| COMPONENT | PARTS BY WEIGHT |
|---|---|
| VINYL RESIN | 55 — 67 |
| UREA-FORMALDEHYDE RESIN | 24 — 33 |
| SURFACTANT | 6 — 17 |

STABLE, WATER-BORNE VINYL CHLORIDE RESIN EMULSION COMPOSITIONS

BACKGROUND OF THE INVENTION

This invention pertains to coating substrates and more particularly to stable, water-borne emulsion compositions containing vinyl chloride polymers.

Vinyl resin lacquers are old in the art and have enjoyed commercial success for coating various substrates with clear vinyl coatings. The coating operation however involves the removal of large quantities of organic solvents in which the vinyl resins are dissolved. For ecological and anti-pollution considerations solvent based coatings are undesirable. This has led to consideration of water-borne resin systems for coating applications. It has not been found feasible to simply substitute a water-borne system for the vinyl resin lacquers for several reasons. While one may make vinyl resin latexes by emulsion polymerization these polymerization techniques require the presence of components in the polymerization recipe which have a deleterious effect on the final coating. This is particularly true in can coatings where such criteria as blush resistance and water resistance, particularly at pasteurization temperatures is required. The presence of surfactants required to maintain stable emulsions increases the susceptibility of resin coatings on substrates to break down in contact with water.

It is also necessary that during the drying stage following the application of the water-borne resin system to a metal substrate that some organic solvent be present to promote proper leveling of the resin to provide a smooth coating.

In the field of can coatings the solution of some problems has led to the creation of new problems. After the hurdles of providing a coating for the interior can which meets physical and chemical criteria have been crossed there still remains the problem of satisfying food and drug regulations.

The FIGURE is a triangular three component graph.

STATEMENT OF THE INVENTION

A stable, water-borne emulsion composition suitable for coating substrates and meeting their requirements outlined above has been provided by a composition consisting essentially of:

(A) about 55 to 67 percent by weight of a normally solid vinyl chloride resin selected from the group consisting of:
  (a) vinyl chloride/vinyl acetate/vinyl alcohol terpolymers containing about 75 to about 91 weight percent vinyl chloride, about 10 to about 25 weight percent vinyl acetate and about 1 to about 15 weight percent vinyl alcohol copolymerized therein;
  (b) a vinyl chloride polymer having copolymerized therein about 75 to about 91 weight percent of vinyl chloride, about 10 to about 25 weight percent vinyl acetate and about 1 to about 15 weight percent of a comonomer selected from the class consisting of maleic acid, fumaric acid or crotonic acid;
  (c) a vinyl chloride terpolymer having copolymerized therein about 75 to about 91 weight percent of vinyl chloride, about 10 to about 25 weight percent vinyl acetate and about 1 to about 15 weight percent of a comonomer selected from the group consisting of glycidyl or hydroxyalkyl acrylate or methacrylate having 2 to 3 carbons in the alkyl group; or
  (d) a mixture of (b) plus (c) wherein the ratio of (b) to (c) is about 1:1 to about 1:3;

(B) about 6 to about 17 weight percent of a non-ionic surfactant having an HLB of about 15 to about 20;

(C) about 24 to about 33 weight percent of a water-immiscible, solvent-free, normally liquid ureaformaldehyde resin which has undergone transetherification with n-butanol or isobutanol, wherein the sum of (A) + (B) + (C) = 100 percent; and (D) about 2 to about 20 parts per hundred parts by weight of (A) + (B) + (C) of an oxygenated hydrocarbon solvent or blend of solvents for said vinyl chloride resin (A), having a relative evaporation rate of about 3 to about 35 and a maximum water solubility of about 2 or less grams per 100 grams of water;

wherein the combination of (A), (B), (C) and (D) has been emulsified in sufficient water, as the continuous phase, to afford an internal solids content of up to about 50 weight percent.

The normally solid vinyl chloride resins recited above are known in the art and are commercially available. The preferred vinyl chloride/vinyl acetate/vinyl alcohol terpolymer is Bakelite vinyl resin VAGH containing about 91% vinyl chloride, 3% vinyl acetate and 6% vinyl alcohol.

Preferred vinyl chloride terpolymers containing a comonomer other than vinyl alcohol would include Bakelite vinyl resin VERR which contains 80% vinyl chloride, 10% vinyl acetate, and 10% glycidyl methacrylate and Bakelite vinyl resin VMCA which contains 81% vinyl chloride, 17% vinyl acetate, and 2% maleic acid.

There is a wide choice available of said surfactants having the limitation of an HLB of about 15 to about 20. The HLB or hydrophilic-lipophilic balance method of surfactant selection defines amphipathic materials, i.e., those having hydrophilic and lipophilic groups in their structures according to numerical values assigned according to the solubility of the surfactant in oil or water. The HLB values can also be calculated from group contributions. HLB values are algebraically additive in the case of surfactant blends. Any material which is to be emulsified has a required HLB value and this value can be attained through the use of a single surfactant or by blending high and low mixtures to obtain an average value. There are hundreds of surfactants commercially available from which a suitable surfactant with the HLB of 15 to 20 can be chosen or formulated by mixing two or more surfactants. While anionic and cationic surfactants in general will give coatings on substrates which are generally acceptable, the requirements for can coatings are more restrictive, and limits one to the use of non-ionic surfactants. One reason for this choice is the necessity for conforming to FDA regulations. Thus for example, Title 21, Code of Federal Regulations Part 121 Section 178.34.00 specifies the types of extractability limits of surfactants used in coatings for food content service. A preferred class of non-ionic surfactants are the ethylene oxide alkylphenol surfactants which have been approved for use in can coatings by the FDA. Specific examples of this class include ethylene oxide adducts of octylphenol, nonylphenol, laurylphenol and the like. Although many anionic type surfactants are approved by the FDA, in general they impart blushing characteristics in the pasteurization test for can coatings and are therefore not acceptable, by canning industry standards. The HLB scheme is described in detail in Emulsions and Emulsion Technology, Surfactant Science, Series, Volume 6, Part I pg. 77 edited by K. J. Lissant, Marcel Dekker, Inc. New York 1974. Other exemplary non-ionic surfactants which are incorporated herein by reference can be found in McCutcheon's Detergents and Emulsifiers, North American Edition, pages 224–226, 1974 Annual.

The urea-formaldehyde resins used in this invention are also commercially available. The preferred urea-formaldehyde resin is a butylated derivative of a standard urea-formaldehyde condensation product obtained by etherification of pendant methylol groups with n-butanol or isobutanol.

The oxygenated hydrocarbon solvents used in this invention having a relative evaporation rate of about 3 to about 35 and a maximum water solubility of about 2 or less grams per 100 grams of water include saturated aliphatic ketones, esters, and glycol ether esters containing about 6 to about 10 carbon atoms. The term "relative evaporation rate" is defined as:

$$\frac{\text{Time for n-butyl acetate to evaporate}}{\text{Time for solvent evaluated to evaporate}} \times 100$$

Preferred oxygenated hydrocarbon solvents include ketones such as methyl isoamyl ketone, methyl isobutyl ketone, ethyl amyl ketone or ethyl butyl ketone; esters such as butyl acetate, propyl acetate or 2-ethyl hexyl acetate; and glycol ether esters such as butyl Cellosolve acetate, butyl Carbitolacetate, or Cellosolve acetate.

While there is extensive patent literature describing the conversion of a resin lacquer to an aqueous emulsion, invariably the descriptions therein involve removing all of the organic solvent in which the resin was initially prepared or dissolved. It is essential for the purposes of this invention and for coating substrates in general with water-borne resin emulsion compositions that some oxygenated organic solvent be present in order to permit smooth flow of the resin and acceptable film formation of the resin on the substrate. Anti-pollution requirements limit the upper level of the organic solvents which can be present in these compositions up to 20% by volume of the volatile phase. It has been found that conventional stripping operations do not provide acceptable conversion of resin lacquers to water-borne emulsion systems. Such a conversion involves emulsification of the lacquer to form an oil-in-water emulsion followed by a stripping process to remove solvent and water. Breaking of the emulsions formed and aggregation of solid resin occurred more often than not when the stripping process was carried out via vacuum distillation. A solution to this problem was found by limiting the heat history of the system during the stripping process to a minimum in equipment such as a wiped thin film evaporator.

In order to evaluate the coating formulations of this invention in simulated can coating procedures, bake cycles typical of those used in the can coating industry were used. Typical bake schedules ranged from 4 minutes at 160° C. to 2 minutes at 196° C. For the pasteurization test coated panels which include various substrates used in beverage cans such as chromate conversion treated aluminum, epoxy primed steel, tin plated steel and the like, are immersed for 45 minutes in deionized water at 77° C. At the end of the hot water immersion test the panels were examined for blush, that is film whitening and adhesion by the Scotch tape test. This involves scratching the panels with a sharp pointed instrument, pressing sections of scotch tape across the scratched portions and then removing the Scotch tape. Successful candidate materials continue to adhere to the substrate when the Scotch tape is pulled off rapidly. No blush or loss of adhesion is permitted for can coating compositions.

The formulations used in this invention can also include minor amounts of additives such as antioxidants, colorants, fillers, heat stabilizers, UV absorbers, and the like.

The criticality of the components of the claimed composition are clearly delineated in the FIGURE which is a three composition graph in which the amounts of vinyl resin, urea-formaldehyde resin and surfactant are represented. Only the cross hatched shaded area in the figure represents acceptable combinations of these three components. Compositions outside of this cross hatched area results in substrate coatings with either unacceptable blush resistance or adhesion or both.

The invention is further described in the example which follows. All parts and percentages are by weight unless otherwise specified.

EXAMPLE 1

A. PREPARATION OF BASE VINYL EMULSION

A vinyl lacquer was prepared by dissolving 26.6 parts by weight of Bakelite VERR (a terpolymer of 80% vinyl chloride, 10% vinyl acetate, and 10% glycidyl methacrylate), 53.4 parts of Bakelite VMCA (a terpolymer of 81% vinyl chloride, 17% vinyl acetate and 2% maleic acid) in 133 parts of methyl isobutylketone and 15 parts of butyl Cellosolve acetate. This mixture was heated to about 60° C. and 11.3 parts of Igepal CO-880 (a nonyl phenol/ethylene oxide adduct) was added to the mixture which was agitated with turbulence. Then 150 parts of water, preheated to 60° C., was added until inversion of a water/oil emulsion to a oil/water emulsion occurs. The emulsion was then passed through a high pressure homogenizer at 3000 psig to reduce the particle size to about 1 to 3 microns.

The formulation at this point consists of the following: 20.5% resin, 2.9% Igepal surfactant, 34.2% methyl isobutylketone, 3.9% butyl Cellosolve acetate, and 38.5% water. This composition had a solids content of 23.4% with volatiles by volume consisting of 55% organic and 45% water.

Using a wiped thin film evaporator (Sold by Kontro Co. Inc., Athole, Mass.) the solids content was increased to about 45.1% by removing solvent and water under the following conditions. The feed rate of emulsion to the evaporator was 28 pounds per hour. The speed of the rotor in the thin film evaporator was 1000 rpm with 30 pounds 30 psig of steam on the jacket. The pressure in the evaporator was 100 mm of Hg. The volatile phase of the concentrated product consisted of about 90:10 water:organic solvent by volume. (5% methyl isobutyl ketone and 5% butyl Cellosolve acetate).

B. PREPARATION OF CROSSLINKER EMULSION

A separate emulsion was prepared consisting of 57.6 parts of solvent free, normally liquid butylated urea-formaldehyde resin (Beetle 80 sold by American Cyanamid Co.), to which was added 2.4 parts of surfactant Igepal CO-880 followed by 40 parts by weight of water with turbulent agitation sufficient to form an oil-in-water emulsion. This emulsion was passed through a high pressure homogenizer at 3000 psig.

C. PREPARATION OF COATING FORMULATIONS

The base vinyl emulsion A prepared from the resin composition having a solids content of 45% was mixed with 0.16 parts of phosphoric acid per 100 parts of emulsion A and 40.0 parts water per 100 parts of emulsion A. To this was added 28.2 parts of the crosslinker emulsion B, per 100 parts of emulsion A, slowly with mild agitation. This afforded the coating composition which was evaluated by applying at levels of 4 to 6 milligrams per square inch of steel panels fabricated from primed metal commonly used in canning operations. The coated panels were baked for 4 minutes at 176° C.

Coated panels were then tested for suitability as can coating formulations by immersing the baked coated panels for 45 minutes in water at 77° C. The coated panels showed no loss of adhesion when tested by the Scotch tape test and no whitening of the film.

EXAMPLES 2 – 6

The procedure described in Example 1 was followed with varying amounts of vinyl emulsion A crosslinker emulsion B, water, phosphoric acid and organic solvent and in all but one case incorporated additional surfactant as shown below:

EXAMPLES

| | PARTS BY WEIGHT | | | | |
|---|---|---|---|---|---|
| | 2 | 3 | 4 | 5 | 6 |
| Base Vinyl Emulsion A at 45.4%g | 100.0 | 100.0 | 100.0 | 100.0 | 100.0 |
| Crosslinker Emulsion B at 60% g | 38.4 | 30.3 | 29.9 | 41.0 | 30.3 |
| Surfactant Solution[1] at 25% g | 53.1 | 36.1 | -0- | 6.4 | 14.4 |
| Water | 12.8 | 15.1 | 28.0 | 31.6 | 23.3 |
| Phosphoric Acid (85%) | 0.13 | 0.12 | 0.10 | 0.14 | 0.10 |
| Solids Content, of above Wt. % | 40.0 | 40.0 | 40.0 | 40.0 | 40.0 |
| Organic Solvent Content, Wt. % | 4.5 | 5.0 | 5.8 | 5.2 | 5.5 |

[1]Igepal CO-880

The dry weight compositions of these formulations are as follows:

| | Percent by Weight | | |
|---|---|---|---|
| Examples | Vinyl Resin | Surfactant | U-F Resin |
| 2 | 55 | 17 | 28 |
| 3 | 59 | 17 | 24 |
| 4 | 67 | 6 | 27 |
| 5 | 60 | 7 | 33 |
| 6 | 64 | 10 | 26 |

These formulations gave satisfactory results when evaluated as coating compositions as in Example 1.

EXAMPLE 7

Using the procedure described in Example 1 a base vinyl emulsion was prepared containing the following components.

| COMPONENT | PARTS BY WEIGHT |
|---|---|
| VERR | 26.6 |

-continued

| COMPONENT | PARTS BY WEIGHT |
|---|---|
| VMCA | 53.4 |
| Methyl isobutylketone | 133.0 |
| Butyl Cellosolve acetate | 15.0 |
| Igepal CO-880 | 12.5 |
| Water (preheated to 60° C.) | 150.0 |

The solids content of this base vinyl emulsion was increased in the thin film evaporator from 23.4% by weight to 45.9% by weight and the ratio of organic solvent:water changed from 55:45 to 10:90.

The coating formulation was prepared by blending the following components:

| COMPONENT | PARTS BY WEIGHT |
|---|---|
| Base Vinyl Emulsion at 45.9% Total solids: | 100.0 |
| Crosslinking emulsion at 60% Total solids: | 28.4 |
| Water | 29.0 |
| Phosphoric acid | 0.09 |

The solids content of the resultant coating formulation was 40% by weight and the organic solvent content 3.2% by weight.

When applied to metal test panels at a level of 4-6 mg/in.$^2$ and baked as described in Example 1 cured coatings were obtained showing good adhesion and no haze development. These cured coatings consisted of 64% vinyl resin, 10% surfactant and 26% urea-formaldehyde resin by weight.

EXAMPLE 8

Example 1 was repeated with the exception that 80 parts of Bakelite VMCH (a terpolymer of 86% vinyl chloride, 13% vinyl acetate and 1% maleic acid) was substituted for the mixture of VERR and VMCA. A coating formulation with properties comparable to those described in Example 1 was obtained.

CONTROLS A, B, C and D

Several formulations were prepared using the components described in Example 1 but in quantities outside its scope. These formulations are delineated below:

| | CONTROLS (PARTS BY WEIGHT) | | | |
|---|---|---|---|---|
| COMPONENT | A | B | C | D |
| Base Vinyl Emulsion 45.4% Total solids: | 100 | 100 | 100 | 100 |
| Crosslinker Emulsion at 60% Total solids | 23.3 | 21.5 | 34.0 | 47.5 |
| Surfactant Solution at 25% | 27.3 | 12.5 | 48.0 | 16.1 |
| Water | 14.9 | 19.5 | 12.5 | 31.1 |
| Phosphoric Acid (85%) | 0.07 | 0.07 | 0.11 | 0.16 |
| Solids Content, Wt. % | 40.0 | 40.0 | 40.0 | 40.0 |
| Organic Solvent Cont. Wt. % | 5.6 | 6.0 | 4.7 | 4.8 |

The dry weight contents of Control A, B, C and D were as follows:

| | Percent by Weight | | |
|---|---|---|---|
| Controls | Vinyl Resin | Surfactant | Urea Resin |
| 6 | 65 | 15 | 20 |
| 7 | 70 | 10 | 20 |
| 8 | 55 | 20 | 25 |

| Controls | Percent by Weight | | |
|---|---|---|---|
| | Vinyl Resin | Surfactant | Urea Resin |
| 9 | 55 | 10 | 35 |

The Control coating compositions were applied to metallic substrates commonly used in canning operations including tin plate, primed steel and chromate treated aluminum. The dry weight of the coatings ranged from 4.0 to 6.0 mg./in.$^2$. Coatings were baked at 176° C. for 4 minutes. This evaluation in contrast to the working Examples showed severe blush and > 50% loss of adhesion with Controls A, B, C and D.

CONTROL E

The effect of using a surfactant having an HLB below the required range is demonstrated in Control E.

An attempt was made to prepare an emulsion by blending the following components:

| COMPONENT | PARTS BY WEIGHT |
|---|---|
| VERR | 26.6 |
| VMCA | 53.4 |
| Methyl isobutylketone | 133.0 |
| Butyl Cellosolve acetate | 15.0 |
| Igepal CO-630 | 11.3 |
| Water (preheated to 60° C.) | 280.0 |

A lacquer was prepared by dissolving VERR and VMCA in a mixture of methyl isobutylketone and butyl Cellosolve acetate in a Waring Blender. The Igepal CO-630 was added next. When the water was added slowly to the lacquer an emulsion did not form. After the stirrer motor was turned off, the system separated into a two-phase, heterogeneous mixture constituting a failure.

CONTROL F

The effect of a vinyl copolymer outside the scope of the invention was demonstrated in Control F.

The following components were used to prepare a test emulsion:

| COMPONENT | PARTS BY WEIGHT |
|---|---|
| Bakelite Vinyl Resin VYHD$^a$ | 80.0 |
| Methyl isobutylketone | 133.0 |
| Butyl Cellosolve acetate | 15.0 |
| Igepal CO-880 | 12.3 |
| Water (preheated to 60° C.) | 120.0 |

$^a$A commercial vinyl chloride copolymer containing 83% vinyl chloride and 13% vinyl acetate copolymerized therein.

A lacquer was prepared by dissolving VYHD in methyl isobutylketone and butyl Cellosolve acetate, by mixing in a Waring Blender. Then the Igepal CO-880 was added followed by water until the water-in-oil emulsion inverted to an oil-in-water emulsion. This emulsion was passed through a high pressure homogenizer, as in Example 1, to reduce particle size. The emulsion was then passed through a wiped thin film evaporator to remove some of the solvent. The composition change resulting was as follows:

| INITIAL EMULSION | AFTER EVAPORATION |
|---|---|
| Total solids: | Total solids: |
| 22% by weight | 38.9% by weight |
| Solvent:Water::60%:40% | Solvent:Water::30%:70% |

A coating composition was prepared as in Example 1, from the following:

| COMPONENT | PARTS BY WEIGHT |
|---|---|
| Emulsion prepared above | 100.0 |
| Crosslinker emulsion from Exp. 1 | 24.1 |
| Water | 9.3 |
| Phosphoric acid | 0.08 |

The solids content of the resultant coating composition was 40% by weight and the organic solvent content was 12.1% by weight. The composition of the coating applied to canning substrates as above was 64% vinyl resin, 10% surfactant, and the ureaformaldehyde resin.

When evaluated as a can coating as described above, the coatings were completely opaque white and had no adhesion to the substrates.

Although the invention has been described in its preferred form with a certain degree of particularity, it is understood that the present disclosure has been made only by way of example, and that numerous changes can be made without departing from the spirit and scope of the invention.

What is claimed is:

1. Stable water-borne emulsion composition suitable for coating substrates consisting essentially of:
   (A) about 55 to 67% by weight of a normally solid vinyl chloride resin selected from the group consisting of:
   (a) vinyl chloride/vinyl acetate/vinyl alcohol terpolymers containing about 75 to about 91 weight % vinyl chloride, about 10 to about 25 weight % vinyl acetate and about 1 to about 15 weight % vinyl alcohol copolymerized therein;
   (b) a vinyl chloride terpolymer having copolymerized therein about 75 to about 91 weight % of vinyl chloride, about 10 to about 25 weight % vinyl acetate and about 1 to about 15 weight % of a comonomer selected from the class consisting of maleic acid, fumaric acid or crotonic acid;
   (c) a vinyl chloride terpolymer having copolymerized therein about 75 to about 91 weight % of vinyl chloride, about 10 to about 25 weight % vinyl acetate and about 1 to about 15 weight % of a comonomer selected from the group consisting of glycidyl or hydroxyalkyl acrylate or methacrylate having 2 to 3 carbons in the alkyl group; and
   (d) a mixture of (b) plus (c) wherein the ratio of (b) to (c) is about 1:1 to about 1:3;
   (B) about 6 to about 17 weight % of a nonionic surfactant having an HLB of about 15 to about 20; and
   (C) about 24 to about 33 weight % of a water-immiscible, solvent-free, normally liquid urea-formaldehyde resin which has undergone transetherification with n-butanol or isobutanol; wherein the sum of (A) + (B) + (C) = 100%; and
   (D) about 2 to about 20 parts per 100 parts by weight of (A) + (B) + (C) of an oxygenated hydrocarbon solvent or blend of solvents for said vinyl chloride resin (A), having a relative evaporation rate of about 3 to about 35 and a maximum water solubility of about 2 or less grams per 100 grams of water; wherein the combination of (A), (B), (C) and (D) has been emulsified in sufficient water, as the continuous phase, to afford an internal solids content of up to about 50 weight %.

2. Composition claimed in claim 1 wherein the normally solid vinyl chloride resin is a vinyl chloride/vinyl acetate/vinyl alcohol terpolymer.

3. Composition claimed in claim 1 wherein the normally solid vinyl chloride resin is a mixture of vinyl chloride/vinyl acetate/glycidyl methacrylate and vinyl chloride/vinyl acetate/maleic acid terpolymers.

4. Composition claimed in claim 1 wherein the normally solid vinyl chloride resin is a vinyl chloride terpolymer having copolymerized therein about 75 to about 91 weight % of vinyl chloride, about 10 to about 25 weight % vinyl acetate and about 1 to about 15 weight % of a comonomer selected from the class consisting of maleic acid, fumaric acid or crotonic acid.

5. Composition claimed in claim 1 wherein the blend of oxygenated hydrocarbon solvent is a blend of methylisobutyl ketone and butyl Cellosolve acetate.

6. Composition claimed in claim 1 wherein the nonionic surfactant is an ethylene oxide adduct of a nonyl phenol.

7. Composition claimed in claim 1 wherein the urea-formaldehyde resin has been transetherified with isobutanol.

* * * * *